United States Patent
Joung et al.

(10) Patent No.: US 8,170,608 B2
(45) Date of Patent: May 1, 2012

(54) TRANSMISSION/RECEPTION CHANNEL MATCHING APPARATUS AND METHOD FOR MOBILE COMMUNICATION TERMINAL AND MOBILE PHONE TEST EQUIPMENT

(75) Inventors: Jinsoup Joung, Seongnam (KR);
Kyeongmin Ha, Seongnam (KR);
Jongmin Kim, Daejeon (KR);
Sunglyong Lim, Seongnam (KR);
Daesung Yun, Seongnam (KR)

(73) Assignee: Innowireless Co., Ltd., Seongnam-si (KR)

( * ) Notice: Subject to any disclaimer, the term of this patent is extended or adjusted under 35 U.S.C. 154(b) by 1002 days.

(21) Appl. No.: 12/126,520

(22) Filed: May 23, 2008

(65) Prior Publication Data

US 2008/0293401 A1    Nov. 27, 2008

(30) Foreign Application Priority Data

May 23, 2007    (KR) .................. 10-2007-0050278

(51) Int. Cl.
*H04M 1/00*    (2006.01)
(52) U.S. Cl. ......... 455/556; 455/569; 455/572; 455/571
(58) Field of Classification Search ............... 455/67.12, 455/67.14, 424, 425
See application file for complete search history.

(56) References Cited

U.S. PATENT DOCUMENTS 6,680,913 B1 *  1/2004  Malmivirta et al. .......... 370/249
7,769,917 B1 *  8/2010  Lee ................................ 710/18

* cited by examiner

*Primary Examiner* — Patrick Edouard
*Assistant Examiner* — Julio Perez
(74) *Attorney, Agent, or Firm* — Rothwell, Figg, Ernst & Manbeck, P.C.

(57) ABSTRACT

Disclosed herein is a transmission/reception channel matching apparatus and method for a mobile communication terminal and a mobile phone test equipment. The apparatus includes mobile communication terminal-side terminals, transmission and reception terminals, a connection detection unit, a switching unit, and a control unit. The mobile communication terminal-side terminals are connected to the option pins of a serial communication port in a one-to-one correspondence. The transmission and reception terminals correspond to the transmission and reception channels of the mobile phone test equipment. The connection detection unit detects the state of connection between the mobile communication terminal-side terminals and the option pins. The switching unit connects the mobile communication terminal-side terminals to the transmission and reception terminals. The control unit automatically sets the transmission and reception channels of the mobile communication terminal and the transmission and reception channels of the mobile phone test equipment with reference to the state of the connection, and outputs the channel matching command.

10 Claims, 4 Drawing Sheets

TRANSMISSION/RECEPTION CHANNEL MATCHING APPARATUS AND METHOD FOR MOBILE COMMUNICATION TERMINAL AND MOBILE PHONE TEST EQUIPMENT

CROSS REFERENCE TO RELATED APPLICATIONS

This application claims priority from Korean Patent Application No. 10-2007-0050278 filed May 23, 2007, all of which is incorporated herein by reference in its entirety for all purposes.

BACKGROUND OF THE INVENTION

1. Field of the Invention

The present invention relates generally to an additional transmission/reception channel matching apparatus for a mobile communication terminal, and, more particularly, to a transmission/reception channel matching apparatus and method for a mobile communication terminal and a mobile phone test equipment which are capable of automatically matching the transmission and reception channels of the mobile phone test equipment for measuring the call quality of the mobile communication terminal with additional serial communication channels, which may vary with each mobile communication terminal.

2. Description of the Related Art

With the rapid development of mobile communication network technology and the popularization of mobile communication terminals, most people are using mobile communication terminals. Accordingly, mobile communication terminal technology is developing, and various functions are added or provided due to competition between mobile communication service providers to satisfy users' various demands. As an example, mobile communication terminals equipped with a Digital Multimedia Broadcasting (DMB) function enjoy such popularity that they account for an overwhelming majority of newly commercialized terminals.

Such mobile communication terminals are becoming personal multimedia devices because high-quality display and sound and high-capacity memory are demanded due to the provision of various additional functions and various types of content. Mobile communication service providers need to measure the call quality of terminals in order to manufacture terminals having superior performance, and mobile communication network operators need to measure call quality in order to measure and optimize the performance or state of provided mobile communication networks.

In a method of measuring call quality, a mobile communication terminal is connected to a mobile phone test equipment, and the mobile phone test equipment transmits a transmission signal for the measurement of call quality to the connected mobile communication terminal. The mobile communication terminal receives and processes the transmission signal and transmits a relevant reception signal to the mobile phone test equipment, and the mobile phone test equipment can measure call quality by analyzing the reception signal.

The connection between the mobile phone test equipment and the mobile communication terminal is set up chiefly through a serial communication port provided in the mobile communication terminal. The functions of respective pins of the serial communication port are standardized in accordance with the Korean Ministry of Information and Communication standard, and the functions of the respective pins are listed in the following Table 1:

TABLE 1

24-pin Type Terminal Pin Map based on Korean Ministry of Information and Communication Standard

| Pin number | Description |
|---|---|
| 1 | Battery ID |
| 2 | Hands-free mode |
| 3 | DSR |
| 4 | Power (+5.0 V) |
| 5 | Power (−5.0 V) |
| 6 | On switch |
| 7 | Audio In/PCM RX/DB RX |
| 8 | Option/PCM clock |
| 9 | Option/PCM sync |
| 10 | Option (USB RX) |
| 11 | Audio In/PXM RX/DM RX |
| 12 | Power GND |
| 13 | RXD |
| 14 | TXD |
| 15 | Option/USB TX |
| 16 | USB Power (+5.0 V/+3.3 V) |
| 17 | DCD |
| 18 | RI |
| 19 | Power GND |
| 20 | RTS |
| 21 | Power (+4.2 V) |
| 22 | Power (−4.2 V) |
| 23 | CTS |
| 24 | DTR |

Table 1 summarizes the functions of respective pins provided in the serial communication port of a mobile communication terminal based on the Korean Ministry of Information and Communication standard. As described in Table 1, the unique designated functions of all 24 pins, except for pin Nos. 7, 8, 9 and 11, have been standardized, and pin Nos. 7, 8, 9 and 11 are defined as option pins that can be freely used by mobile communication terminal manufacturers.

Accordingly, each of the terminal manufacturers, who manufacture products using additional serial communication channels, except for pin Nos. 13 and 14 used for standard serial communication, (representative examples include combined CDMA/WCDMA terminals and products in which DM and data communication ports are different from each other), selects two pins from among option pin Nos. 7, 8, 9 and 11 and sets and uses the two pins for relevant additional serial communication channels. Table 2 shows the use of the additional serial communication channels of representative mobile communication terminals.

TABLE 2

| Classification | Company K's W1xxx | Company S's SPH-S3xxx | Company K's EvD0-x | Company K's W2xxx |
|---|---|---|---|---|
| TX2 | No. 9 | No. 11 | No. 7 | No. 9 |
| RX2 | No. 8 | No. 7 | No. 11 | No. 8 |

However, since each manufacturer freely selects two pins from among option pins and sets the two pins for communication channels for each mobile communication model, a disadvantage arises in that dedicated connection cables corresponding to each mobile communication terminal must be provided in order to measure the call quality of various mobile communication terminals and mobile communication networks. That is, since pins set for transmission and reception channels in the terminal W1xxx of company K are different from pins set for transmission and reception channels in the terminal SPH-S3xxx of company S, as shown in Table 2, it is impossible to measure the call quality of the two terminals using the same connection cables.

SUMMARY OF THE INVENTION

Accordingly, the present invention has been made keeping in mind the above problems occurring in the prior art, and an object of the present invention is to provide a transmission/reception channel matching apparatus and method for a mobile communication terminal and a mobile phone test equipment, which are capable of automatically detecting the additional serial communication channels of the mobile communication terminal, which may vary with mobile communication terminal manufacturer or mobile communication terminal model, and matching the transmission and reception channels of the mobile communication terminal with the transmission and reception channels of the mobile phone test equipment.

Another object of the present invention is to provide a transmission/reception channel matching apparatus and method for a mobile communication terminal and a mobile phone test equipment, which are capable of matching the transmission and reception channels of the mobile communication terminal with the transmission and reception channels of the mobile phone test equipment only through the input of the identification information of the mobile communication terminal by a tester.

Still another object of the present invention is to provide a transmission/reception channel matching apparatus and method for a mobile communication terminal and a mobile phone test equipment, which are capable of updating the additional serial communication channel information of the mobile communication terminal, thereby enabling flexible dealing with mobile communication terminals having new additional serial communication channels.

According to an aspect of the present invention, when a tester connects the mobile communication terminal to the channel matching apparatus connected to the mobile phone test equipment for a test of call quality, the channel matching apparatus inspects the state of the connection of option pins by applying reference power to the option pins of the mobile communication terminal, that is, the pin Nos. 7, 8, 9 and 11.

Resistors having the same resistor value are electrically connected to respective mobile communication terminal-side terminals of the channel matching apparatus connected to the option pins of the mobile communication terminal, and the control unit of the channel matching apparatus detects voltages applied to the respective resistors.

When a voltage different from a reference voltage is detected in any one of the resistors, an option pin connected to a relevant mobile communication terminal-side terminal is determined to be a pin set for a transmission channel, that is, a transmission pin, and a channel matching command is issued to a switching unit so that a transmission terminal connected to the transmitting terminal of the mobile phone test equipment is electrically connected to the transmission pin, thereby matching the transmission channel of the mobile communication terminal with the transmission channel of the mobile phone test equipment.

When the transmission channel of the mobile communication terminal is matched with the transmission channel of the mobile phone test equipment, the control unit of the channel matching apparatus outputs a transmission signal for reception channel matching to the matched transmission pin over the transmission channel. Furthermore, the control unit outputs a control signal to the switching unit so that the remaining three mobile communication terminal-side terminals, other than the mobile communication terminal-side terminals set for the transmission channel, are sequentially connected to the reception terminal of the mobile phone test equipment. Thereafter, when a mobile communication terminal-side terminal, through which a reception signal corresponding to the transmission signal is received, is detected, an option pin connected to the relevant mobile communication terminal-side terminal is determined to be a pin set for a reception channel, that is, a reception pin, and a channel matching command is issued to the switching unit so that the reception terminal connected to the receiving terminal of the mobile phone test equipment is electrically connected to the relevant reception pin, thereby matching the reception channel of the mobile communication terminal with the reception channel of the mobile phone test equipment.

Accordingly, the transmission/reception channel matching apparatus and method for a mobile communication terminal and a mobile phone test equipment according to the present invention have an advantage in that the additional serial communication channels of the mobile communication terminal, which may vary with manufacturer or model, are automatically searched for and the transmission and reception channels of the mobile communication terminal are automatically matched with the transmission and reception channels of the mobile phone test equipment based on search results, thereby enabling transmission/reception channel matching for tests of the quality of various mobile communication terminals using a single channel matching apparatus.

According to another aspect of the present invention, the transmission/reception channel matching apparatus and method for a mobile communication terminal and a mobile phone test equipment receive identification information, which is the unique information of the mobile communication terminal output from the mobile phone test equipment according to the present invention, and automatically match the transmission and reception channels of the mobile communication terminal with the transmission and reception channels of the mobile phone test equipment based on the identification information.

Accordingly, the control unit of the channel matching apparatus receives the identification information of the mobile communication terminal from the mobile phone test equipment, accesses information about the transmission and reception pins of additional serial communication channels corresponding to the identification information in the transmission and reception pin information database, and outputs a channel matching command so that mobile communication terminal-side terminals connected to the accessed transmission and reception pins are electrically connected to the transmission terminal and the reception terminal, thereby matching the transmission and reception channels of the mobile communication terminal with the transmission and reception channels of the mobile phone test equipment.

Accordingly, the transmission/reception channel matching apparatus and method for a mobile communication terminal and a mobile phone test equipment according to the present invention have an advantage in that a tester can easily match the transmission and reception channels of the mobile communication terminal with the transmission and reception channels of the mobile phone test equipment only through the input of the identification information of the mobile communication terminal, regardless of the additional serial communication channels of the mobile communication terminal, which vary with manufacturer or model.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference should be made to the drawings, in which the same reference numerals are used throughout the different drawings to designate the same or similar components.

The above-described and additional aspects of the present invention will be apparent through preferred embodiments that will be described with reference to the accompanying drawings. The present invention will be described in detail below so that those skilled in the art can easily understand and reproduce the present invention through the embodiments.

Figure 1:
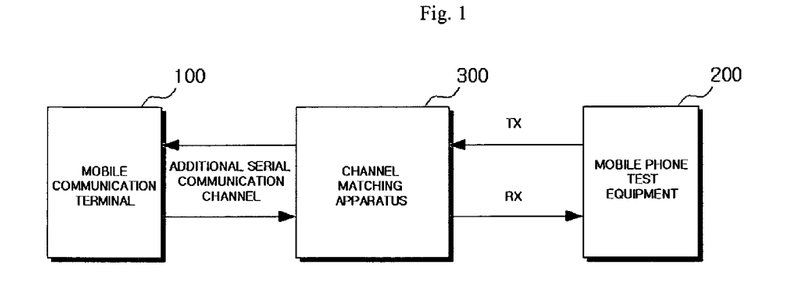
FIG. 1 is a diagram schematically showing a transmission/reception channel matching system for a mobile communication terminal and a mobile phone test equipment according to a preferred embodiment of the present invention.

FIG. 1 is a diagram schematically showing a transmission/reception channel matching system for a mobile communication terminal and a mobile phone test equipment according to a preferred embodiment of the present invention. As shown in this drawing, the transmission/reception channel matching system for a mobile communication terminal and a mobile phone test equipment according to the present invention includes a mobile communication terminal 100, a mobile phone test equipment 200 for measuring the call quality of the mobile communication terminal 100, and a channel matching apparatus 300 for matching the transmission and reception channels of the mobile communication terminal 100 with the transmission and reception channels of the mobile phone test equipment 200.

The mobile phone test equipment 200 measures the call quality of the target mobile communication terminal 100 or a mobile communication network in such a way as to output a transmission signal for the measurement of call quality to the mobile communication terminal 100 connected through the channel matching apparatus 300 and receive and analyze a relevant reception signal from the mobile communication terminal 100. Since such a mobile phone test equipment 200 is a well-known device, a detailed description thereof will be omitted here.

The channel matching apparatus 300 matches the transmission and reception channels of the mobile communication terminal 100 with the transmission and reception channels of the mobile phone test equipment 200 in such a way as to automatically search for transmission and reception pins for additional serial communication channels among option pins provided in the 24-pin serial communication port of the mobile communication terminal 100 and electrically connect transmission and reception terminals 331 and 333 corresponding to the transmission and reception channels of the mobile phone test equipment 200. A more detailed description of the channel matching apparatus 300 will be given with reference to FIG. 2 below.

Figure 2:
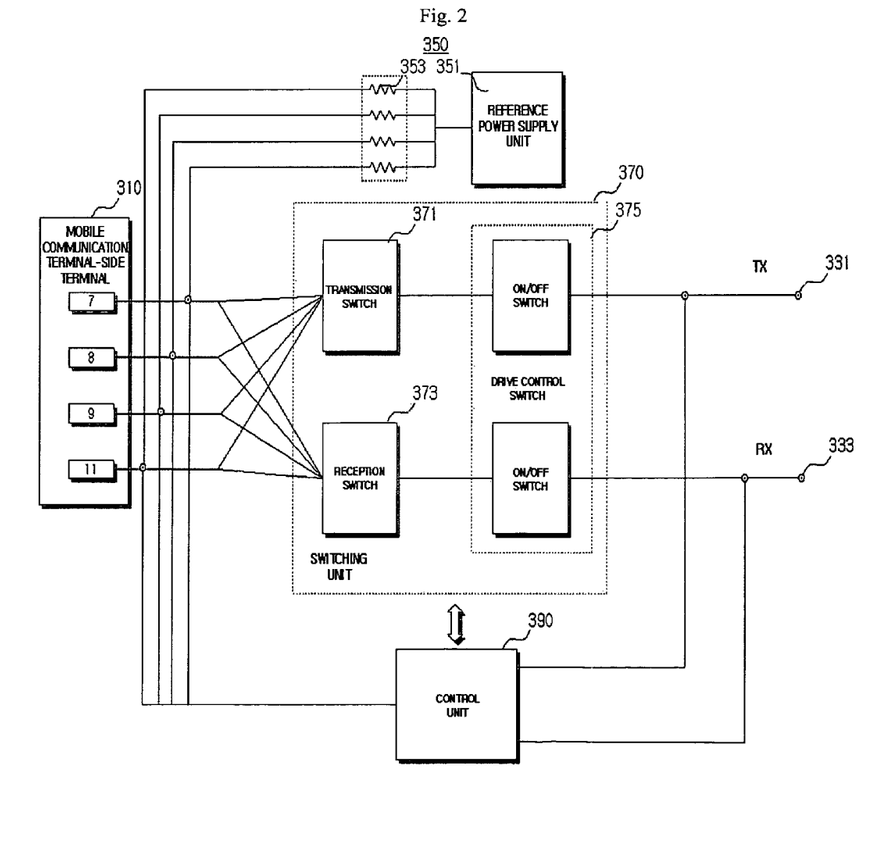
FIG. 2 is a block diagram schematically showing a transmission/reception channel matching apparatus for a mobile communication terminal and a mobile phone test equipment according to a preferred embodiment of the present invention.

FIG. 2 is a block diagram schematically showing a transmission/reception channel matching apparatus 300 for a mobile communication terminal and a mobile phone test equipment according to a preferred embodiment of the present invention. As shown in this drawing, the channel matching apparatus 300 according to the present invention includes mobile communication terminal-side terminals 310 connected to the option pins of a serial communication port provided in the mobile communication terminal 100 in a one-to-one correspondence; transmission and reception terminals 331 and 333 corresponding to the transmission and reception channels of the mobile phone test equipment 200 for measuring the call quality of the mobile communication terminal 100; a connection detection unit 350 for detecting the state of the connection between the mobile communication terminal-side terminals 310 and the option pins; a switching unit 370 for selectively connecting the mobile communication terminal-side terminals 310 to the transmission and reception terminals 331 and 333 in compliance with a channel matching command; and a control unit 390 for automatically setting the transmission and reception channels of the mobile communication terminal 100 and the mobile phone test equipment 200 with reference to the state of the connection, detected by the connection detection unit 350, and outputting the channel matching command to the switching unit 370.

The mobile communication terminal-side terminals 310 are connected to the option pins of the mobile communication terminal 100 in a one-to-one correspondence. That is, the mobile communication terminal-side terminals are electrically connected to pin Nos. 7, 8, 9 and 11, used as option pins, among relevant 24 pins, and the remaining 20 pins, other than the 4 option pins, are bypassed and directly connected to the mobile phone test equipment 200.

The transmission terminal 331 is connected to the transmission channel of the mobile phone test equipment 200 for outputting a transmission signal, while the reception terminal 333 is connected to the reception channel of the mobile phone test equipment 200. The transmission and reception terminals 331 and 333 are selectively connected to the mobile communication terminal-side terminals 310 by the switching unit 370.

The connection detection unit 350 detects the state of the connection between the mobile communication terminal-side terminals 310 and the option pins of the mobile communication terminal 100. The connection detection unit 350 applies reference power to resistors 353 connected to the mobile communication terminal-side terminals 310, and detects variation in the voltage of the resistors 353. Thus, the connection detection unit 350 according to the present invention includes a reference power supply unit 351 configured to apply reference power to the mobile communication terminal-side terminals 310 and resistors 353 configured such that second ends thereof are connected to the mobile communication terminal-side terminals 310 when the first ends thereof are connected to the reference power supply unit 351.

The reference power supply unit 351 may be a kind of power supply that applies reference power, such as a voltage of 2.5 V, to each of the resistors 353. Additionally, the reference power supply unit 351 may be supplied with power from a channel connected to a pin responsible for power among 20 pins, other than bypassed option pins, and supply reference power to the mobile communication terminal-side terminals 310.

All of the resistors 353 have the same resistor value. The first ends of the resistors 353 are connected to the reference power supply unit 351, while the second ends thereof are connected to the mobile communication terminal-side terminals 310. Each resistor 353 outputs a voltage different from the voltage of the reference power depending on variation in load within the mobile communication terminal 100 connected to the option pins.

The switching unit 370 selectively connects the mobile communication terminal-side terminals 310, connected to the transmission and reception pins, to the transmission and reception terminals 331 and 333 of the mobile communication terminal 100 in compliance with a channel matching command from the control unit 390. Thus, the switching unit 370 includes a transmission switch 371 for connecting the transmission terminal 331 to a mobile communication terminal-side terminal 310, set for a transmission channel, in compliance with a channel matching command from the control unit 390; and a reception switch 373 for connecting the reception terminal 333 to a mobile communication terminal-side terminal 310, set for a reception channel, in compliance with a channel matching command from the control unit 390.

The transmission switch 371 may be implemented using, for example, a data select logic circuit, such as a 1×4 demultiplexer that selectively outputs a transmission signal, output from the transmission terminal 331, to one of the mobile communication terminal-side terminals 310 connected to the four option pins. The transmission switch 371 performs switching to allow a transmission signal, transmitted from the mobile phone test equipment 200 through the transmission terminal, to be output to a mobile communication terminal-side terminal 310 connected to a transmission pin set for a transmission channel, thereby enabling the transmission of the transmission signal to the mobile communication terminal 100.

The reception switch 373 may be implemented, for example, using a data select logic circuit, such as a 1×4 demultiplexer that selects one from among four reception signals output from four mobile communication terminal-side terminals 310, and outputs the signal to the reception terminal 333. The reception switch 373 performs switching so that a reception signal, transmitted from a mobile communication terminal-side terminal connected to a reception pin set for a reception channel, is output to the reception terminal 333, thereby enabling the transmission of the reception signal to the mobile phone test equipment 200.

The control unit 390 may be implemented using, for example, a microcontroller into which a microprocessor for performing operations and a peripheral circuit are integrated, and controls the overall operation of the channel matching apparatus 300. The control unit 390 detects variation in voltage applied to the resistors 353 connected to the mobile communication terminal-side terminals 310, and, if there is a resistor 353 from which a different voltage is detected, determines that an option pin corresponding to a mobile communication terminal-side terminal 310 connected to the relevant resistor 353 has been set for a transmission channel, and issues a channel matching command to the transmission switch 371. Accordingly, the transmission switch 371 receives a channel matching command, and connects the transmission terminal 331 to a mobile communication terminal-side terminal 310 connected to the transmission pin set for a transmission channel, thereby matching the transmission channel of the mobile communication terminal 100 with the transmission channel of the mobile phone test equipment 200.

For example, when a power of 2.5 V is supplied to the resistors 353 by the reference power supply unit 351, the same voltage is detected from all of the resistors 353 in the case in which no additional load is present on any one of the mobile communication terminal-side terminals 310 connected to the respective resistors 353. In contrast, in the case in which additional load, that is, the connection of a transmission pin, set for a transmission channel, among the option pins of the mobile communication terminal 100, is present on a mobile communication terminal-side terminal 310, variation in load occurs, and thus a voltage different from a reference voltage, such as 0 V or 3.3 V, is detected. Accordingly, the control unit 390 detects the mobile communication terminal-side terminal 310 connected to the transmission pin of the mobile communication terminal 100 based on variation in the voltage of the relevant resistor 353.

When the transmission pin of the mobile communication terminal 100 is detected and the mobile communication terminal-side terminal 310 connected to the transmission pin is connected to the transmission terminal 331 by the transmission switch 371, the control unit 390 outputs a transmission signal for searching for a reception channel to the mobile communication terminal-side terminal 310 connected to the transmission pin. Furthermore, the switching unit 370 outputs a control signal so that the mobile communication terminal-side terminals 310, except for the mobile communication terminal-side terminal 310 connected to the transmission pin, are sequentially connected to the reception terminal 333. If a mobile communication terminal-side terminal 310, through which a reception signal corresponding to the transmission signal is received, is detected, an option pin connected to the relevant mobile communication terminal-side terminal 310 is determined to be a reception pin set for a reception channel, and a channel matching command is issued to the reception switch 373. The reception switch 373 matches the reception channel of the mobile communication terminal 100 with the reception channel of the mobile phone test equipment 200 through the connection of the reception terminal 333 and the mobile communication terminal-side terminal 310, connected to the reception pin set for a reception channel, to each other.

For example, when a mobile communication terminal-side terminal 310, connected to a pin No. 7, is set for a transmission channel, the control unit 390 outputs a transmission signal for the searching of a reception pin, set for a reception channel, to the pin No. 7. Furthermore, the control unit 390 outputs a control signal to the switching unit 370 so that the mobile communication terminal-side terminals 310 connected to pin Nos. 8, 9 and 11 are sequentially connected to the reception terminal 333, and determines whether a reception signal is received through any one of the mobile communication terminal-side terminals 310. If the reception signal is received through a mobile communication terminal-side terminal 310 connected to the pin No. 9, the control unit 390 determines that the pin No. 9 is a reception pin set for a reception channel, and issues a channel matching command to the reception switch 373. Accordingly, the reception switch 373 matches the reception channel of the mobile communication terminal 100 with the reception channel of the mobile phone test equipment 200 through the reception of the channel matching command and the connection of the reception terminal 333 and the mobile communication terminal-side terminal 310, connected to the pin No. 9, to each other.

As a result, the transmission/reception channel matching apparatus for a mobile communication terminal and a mobile phone test equipment according to the present invention has an advantage in that the additional serial communication channels of a mobile communication terminal different for each manufacturer or each model are automatically searched for and the transmission and reception channels of the mobile communication terminal are matched with the transmission and reception channels of the mobile phone test equipment, thereby enabling transmission/reception channel matching for tests of the quality of various mobile communication terminals using a single channel matching apparatus.

According to another aspect of the present invention, a channel matching apparatus according to the present invention receives the identification information of the mobile communication terminal 100, such as the unique number of the mobile communication terminal 100, from the mobile phone test equipment 200, searches for the additional serial communication channel information of the mobile communication terminal 100 corresponding to the identification information, and matches the transmission and reception channels of the mobile communication terminal 100 with the transmission and reception channels of the mobile phone test equipment 200 with reference to the found additional serial communication channel information.

A more detailed description of the channel matching apparatus 300 according to another embodiment of the present invention will be given below with reference to FIG. 3.

Figure 3:
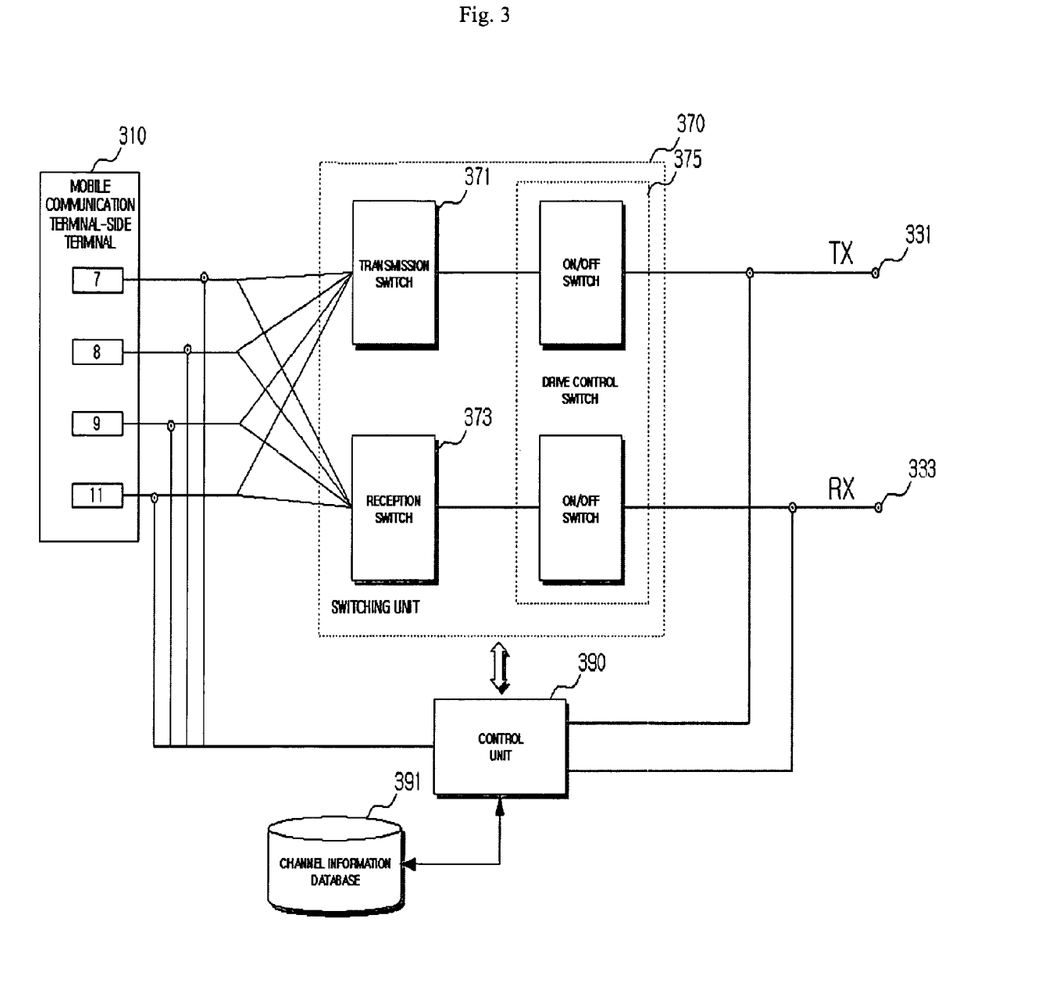
FIG. 3 is a block diagram schematically showing a transmission/reception channel matching apparatus for a mobile communication terminal and a mobile phone test equipment according to another embodiment of the present invention.

FIG. 3 is a block diagram schematically showing a transmission/reception channel matching apparatus 300 for a mobile communication terminal and a mobile phone test equipment according to another embodiment of the present invention. As shown in this drawing, the channel matching apparatus 300 according to another embodiment of the present invention does not include the connection detection unit of the construction of the channel matching apparatus 300 illustrated in FIGS. 1 and 3, but includes a channel information database 391 that stores information about option pins, set for additional serial communication channels, for each piece of identification information of the mobile communication terminal 100. Furthermore, the control unit 390 receives the identification information of the mobile communication terminal 100 from the mobile phone test equipment 200, accesses option pin information corresponding to relevant identification information, and issues a channel matching command to the switching unit 370 so that the transmission and reception channels of the mobile communication terminal 100 are matched with the transmission and reception channels of the mobile phone test equipment 200 based on the accessed option pin information.

The channel information database 391 is implemented using, for example, using a memory device, such as readable and writable EEPROM or flash memory, and stores additional serial communication channel information corresponding to the identification information of a plurality of mobile communication terminals 100. The additional serial communication channel information includes information about a transmission pin, set for a transmission channel, among the option pins of the mobile communication terminal 100, and information about a reception pin, set for a reception channel, among the option pins. The additional serial communication channel information is accessed and controlled by the control unit 390.

Accordingly, when the identification information of the target mobile communication terminal 100 is input from the mobile phone test equipment 200, the control unit 390 receives the identification information of the mobile communication terminal 100 from the mobile phone test equipment 200. The control unit 390 accesses corresponding additional serial communication channel information in the channel information database 391 using the identification information, and extracts information about a transmission pin and a reception pin from the accessed additional serial communication channel information. The extracted information about a transmission pin and a reception pin is output to the switching unit 370, and the switching unit 370 connects the transmission terminal 331 and the reception terminal 333 based on the information about a transmission pin and a reception pin information, thereby matching the transmission and reception channels of the mobile communication terminal 100 with the transmission and reception channels of the mobile phone test equipment 200.

As a result the transmission/reception channel matching apparatus for a mobile communication terminal and a mobile phone test equipment according to the present invention has an advantage in that a tester can easily match the transmission and reception channels of the mobile communication terminal with the transmission and reception channels of the mobile phone test equipment only through the input of the identification information of the mobile communication terminal, regardless of the additional serial communication channels of the mobile communication terminal 100, which vary with manufacturer or model.

According to an additional aspect of the present invention, the control unit 390 of the channel matching apparatus 300 according to the present invention receives additional serial channel information attributable to the addition of a new mobile communication terminal 100 from the mobile phone test equipment 200, and updates the information of the channel information database 391. Furthermore, the switching unit 370 according to the present invention further includes a drive control switch 375 that blocks the operation of a relevant switching unit 370 in order to prevent update information from being transmitted to the mobile communication terminal 100 over the matched transmission and reception channels.

The drive control switch 375 may be implemented using an electronic digital switch, and is driven when it is necessary to perform update based on the additional serial communication channel information of a new mobile communication terminal 100.

When a tester inputs a drive control switch control command through the mobile phone test equipment 200, the control unit 390 turns off the switch in compliance with the relevant control command, thereby preventing update information, output from the mobile phone test equipment 200, from being input and output to and from the mobile communication terminal 100 over the matched transmission and reception channels. Furthermore, the update of the additional serial communication channel information of the new mobile communication terminal 100 is completed, the control unit 390 issues a control command to the drive control switch 375, thereby activating the drive of the switching unit 370 again.

A transmission/reception channel matching process for a mobile communication terminal 100 and a mobile phone test equipment 200 according to a preferred embodiment of the present invention will be described in detail below with reference to FIG. 4.

Figure 4:
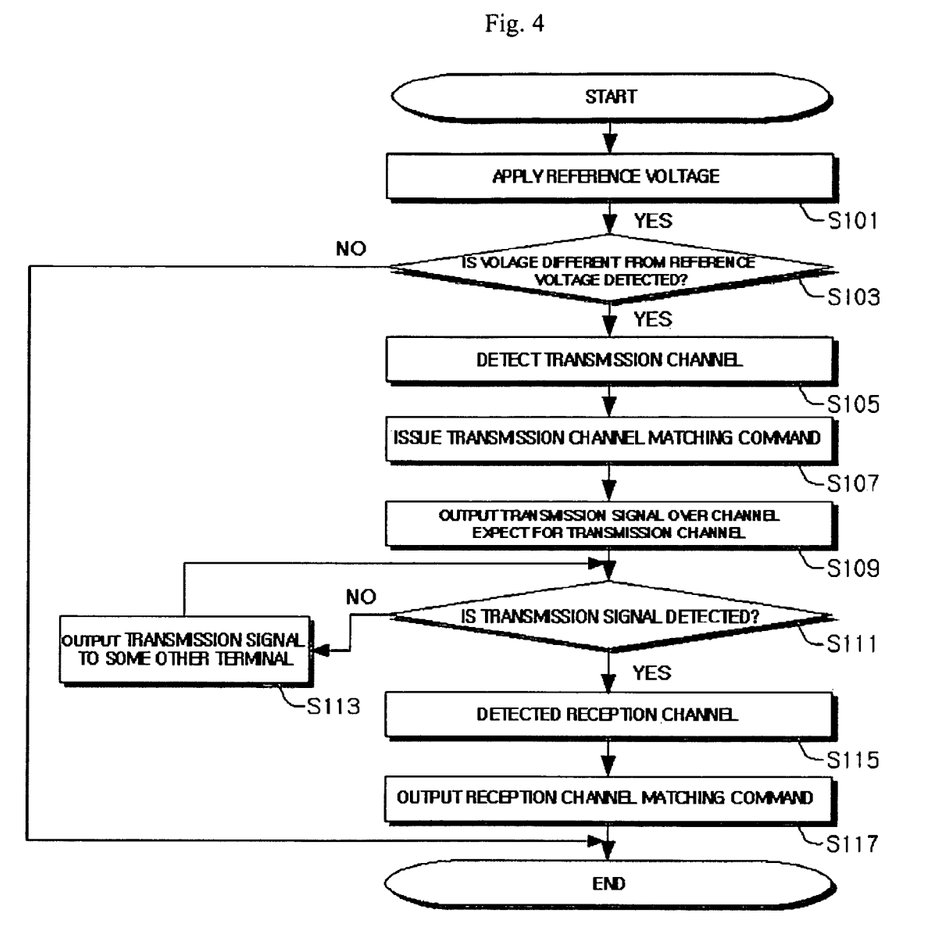
FIG. 4 is a flowchart schematically showing a transmission/reception channel matching process for a mobile communication terminal and a mobile phone test equipment according to a preferred embodiment of the present invention.

FIG. 4 is a flowchart schematically showing a transmission/reception channel matching process for a mobile communication terminal and a mobile phone test equipment according to a preferred embodiment of the present invention. As shown in this drawing, in a transmission/reception channel matching method according to the present invention, when a tester connects the target mobile communication terminal 100 to the channel matching apparatus 300, the channel matching apparatus 300 detects the state of the connection of the option pins by applying reference power to the option pins of the mobile communication terminal 100 and the mobile communication terminal-side terminals 310 at step S101. The channel matching apparatus 300 detects variation in the voltage of the option pins at step S103, detects an option pin, exhibiting a different voltage, as a transmission pin set for the transmission channel of additional serial communication channels at step S105, and issues a channel matching command to the switching unit 370 so that the transmission pin is connected to the transmission terminal 331 of the mobile phone test equipment 200 at step S107, thereby matching the transmission channel of the mobile communication terminal 100 with the transmission channel of the mobile phone test equipment 200.

When the transmission channels are matched with each other, a transmission signal for reception channel matching is output over the transmission channel at step S109, and an option pin, through which a reception signal corresponding to the transmission signal is received, is searched for by sequentially inspecting the option pins, except for the reception pin set for the transmission channel. When an option pin, though which the reception signal is received, is detected from among the option pins, except for the reception pin, the relevant pin is determined to be a reception pin set for the reception channel of additional serial communication channels at steps S111, S113 and S115, and a channel matching command is issued to the switching unit 370 to connect the reception pin to the reception terminal 333 of the mobile phone test equipment 200, thereby matching the reception channel of the mobile communication terminal 100 with the reception channel of the mobile phone test equipment 200 at step S117.

The above-described transmission/reception channel matching method for a mobile communication terminal and a mobile phone test equipment is performed using the channel matching apparatus 300 described in detail with reference to FIGS. 1 and 2, and a description of the operations between the elements thereof is omitted here.

Figure 5:
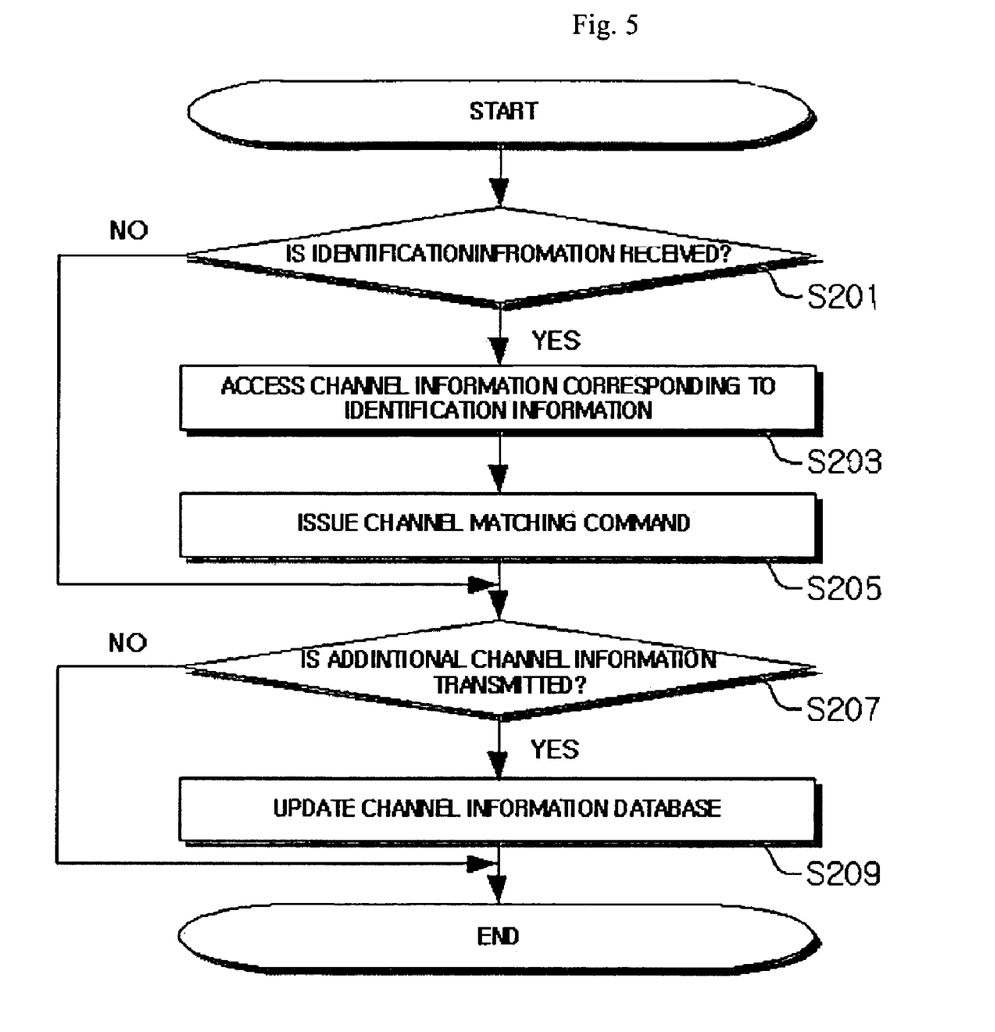
FIG. 5 is a flowchart schematically showing a transmission/reception channel matching process for a mobile communication terminal and a mobile phone test equipment according to another embodiment of the present invention.

FIG. 5 is a flowchart schematically showing a transmission/reception channel matching process for a mobile communication terminal and a mobile phone test equipment according to another embodiment of the present invention. As shown in this drawing, the transmission/reception channel matching for a mobile communication terminal and a mobile phone test equipment according to the present invention includes connecting the target mobile communication terminal 100 to the channel matching apparatus 300 and inputting the identification information of the mobile communication terminal 100 through the mobile phone test equipment 200. The channel matching apparatus 300 receives the identification information of the mobile communication terminal 100 from the mobile phone test equipment 200 at step S201, accesses information about the transmission and reception pins of additional serial communication channels corresponding to the identification information in the channel information database 391 at step S203, and issues a channel matching command to the switching unit 370 so that the transmission pin and the reception pin are respectively connected to the transmission terminal 331 and reception terminal 333 of the mobile phone test equipment 200 based on the information about the transmission pin and the reception pin at step S205, thereby matching the transmission and reception channels of the mobile communication terminal 100 with the transmission and reception channels of the mobile phone test equipment 200.

According to an additional aspect of the present invention, the transmission/reception channel matching method for a mobile communication terminal and a mobile phone test equipment according to the present invention includes, when receiving information about the transmission and reception pins of the additional serial communication channels of a new mobile communication terminal 100 from the mobile phone test equipment 200 at step S207, storing the information about the transmission and reception pins in the channel information database 391 at step S209. In this case, the drive on/off switches of the switching unit 370 are turned off, and prevents input and output to and from the mobile communication terminal 100 over the matched transmission and reception channels. The transmission/reception channel matching method for a mobile communication terminal and a mobile phone test equipment is performed using the channel matching apparatus 300 described in detail with reference to FIG. 3, a description of the operations between the elements thereof is be omitted here.

The transmission/reception channel matching apparatus and method for a mobile communication terminal and a mobile phone test equipment according to the present invention have an advantage in that the transmission and reception pins of the additional serial communication channels of a mobile communication terminal, which may vary with manufacturer or model, are automatically searched for and the transmission and reception channels of the mobile communication terminal are automatically matched with the transmission and reception channels of the mobile phone test equipment based on search results, thereby enabling transmission/reception channel matching for tests of the quality of various mobile communication terminals using a single channel matching apparatus.

Furthermore, the transmission/reception channel matching apparatus and method for a mobile communication terminal and a mobile phone test equipment according to another aspect of the present invention have an advantage in that the connection between the mobile communication terminal and the mobile phone test equipment is easily set up only through the input of the identification information of the mobile communication terminal.

Furthermore, the transmission/reception channel matching apparatus and method for a mobile communication terminal and a mobile phone test equipment according to the present invention have an advantage in that information about the transmission and reception pins of the additional serial communication channels of a newly added mobile communication terminal can be updated, thereby enabling flexible dealing with mobile communication terminals having various transmission and reception channels, which are currently present or will be present in the future.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A transmission/reception channel matching apparatus for a mobile communication terminal and a mobile phone test equipment, comprising:

mobile communication terminal-side terminals connected to option pins of a serial communication port provided in the mobile communication terminal in a one-to-one correspondence;

transmission and reception terminals corresponding to transmission and reception channels of the mobile phone test equipment for measuring call quality of the mobile communication terminal;

a connection detection unit for detecting a state of connection between the mobile communication terminal-side terminals and the option pins;

a switching unit for selectively connecting the mobile communication terminal-side terminals to the transmission and reception terminals in compliance with a channel matching command; and a control unit for automatically setting transmission and reception channels of the mobile communication terminal and transmission and reception channels of the mobile phone test equipment with reference to the state of the connection, detected by the connection detection unit, and outputting the channel matching command to the switching unit.

2. The transmission/reception channel matching apparatus as set forth in claim 1, wherein the connection detection unit comprises:

a reference power supply unit configured to apply reference power to the mobile communication terminal-side terminals; and resistors configured such that second ends thereof are connected to the mobile communication terminal-side terminals When first ends thereof are connected to the reference power supply unit.

3. The transmission/reception channel matching apparatus as set forth in claim 1, wherein the switching unit comprises: a transmission switch for connecting the transmission terminal to any one of the mobile communication terminal-side terminals in compliance with a channel matching command from the control unit; and a reception switch for connecting the reception terminal to any one of the mobile communication terminal-side terminals in compliance with a channel matching command from the control unit.

4. The transmission/reception channel matching apparatus as set forth in claim 3, wherein the control unit detects a mobile communication terminal-side terminal, connected to a resistor in which variation in voltage occurs, as the transmission channel, issues a channel matching command to the transmission switch, detects a mobile communication terminal-side terminal, through which, a reception signal, corresponding to a transmission signal that is transmitted through the mobile communication terminal-side terminal detected as the transmission channel, is received, as the reception channel, and issues a channel matching command to the reception switch.

5. A transmission/reception channel matching apparatus for a mobile communication terminal and a mobile phone test equipment, comprising:

mobile communication terminal-side terminals connected to option pins of a serial communication port provided in the mobile communication terminal in a one correspondence;

transmission and reception terminals corresponding to transmission and reception channels of the mobile phone test equipment for measuring call quality of the mobile communication terminal;

a channel information database for storing information about option pins, set for additional serial communication channels, for identification information of the mobile communication terminal;

a switching unit for selectively connecting the mobile communication terminal-side terminals to the transmission and reception terminals in compliance with a channel marching command; and a control unit for receiving the identification information of the mobile communication terminal, accessing the information about option pins, automatically setting transmission and reception channels of the mobile communication terminal and transmission and reception channels of the mobile phone test equipment based on the accessed information about option pins, and outputting the channel matching command to the switching unit.

6. The transmission/reception channel matching apparatus as set forth in claim 5, wherein the switching unit comprises:

a transmission switch for selectively connecting the transmission terminal to any one of the mobile communication terminal-side terminals in compliance with the channel matching command from the control unit; and a reception switch for selectively connecting the reception terminal to any one of the mobile communication terminal-side terminals in compliance with the channel matching command from the control unit.

7. The transmission/reception channel matching apparatus as set forth in claim 6, wherein the switching unit further comprises a drive control switch that controls On/Off operation of the transmission switch and the reception switch.

8. The transmission/reception channel matching apparatus as set forth in claim 7, wherein the control unit updates information of the channel information database based on the information about option pins, set for the additional serial communication channels of the mobile communication terminal, transmitted from the mobile phone test equipment.

9. The transmission/reception channel matching apparatus as set forth in claim 6, wherein the control unit updates information of the channel information database based on the information about option pins, set for the additional serial communication channels of the mobile communication terminal, transmitted from the mobile phone test equipment.

10. The transmission/reception channel matching apparatus as set forth in claim 5, wherein the control unit updates information of the channel information database based on the information about option pins, set for the additional serial communication channels of the mobile communication terminal, transmitted from the mobile phone test equipment.

* * * * *